E. B. Bigelow.
Loom.
N°86,806.   Patented Feb. 9, 1869.
Fig. 5ª
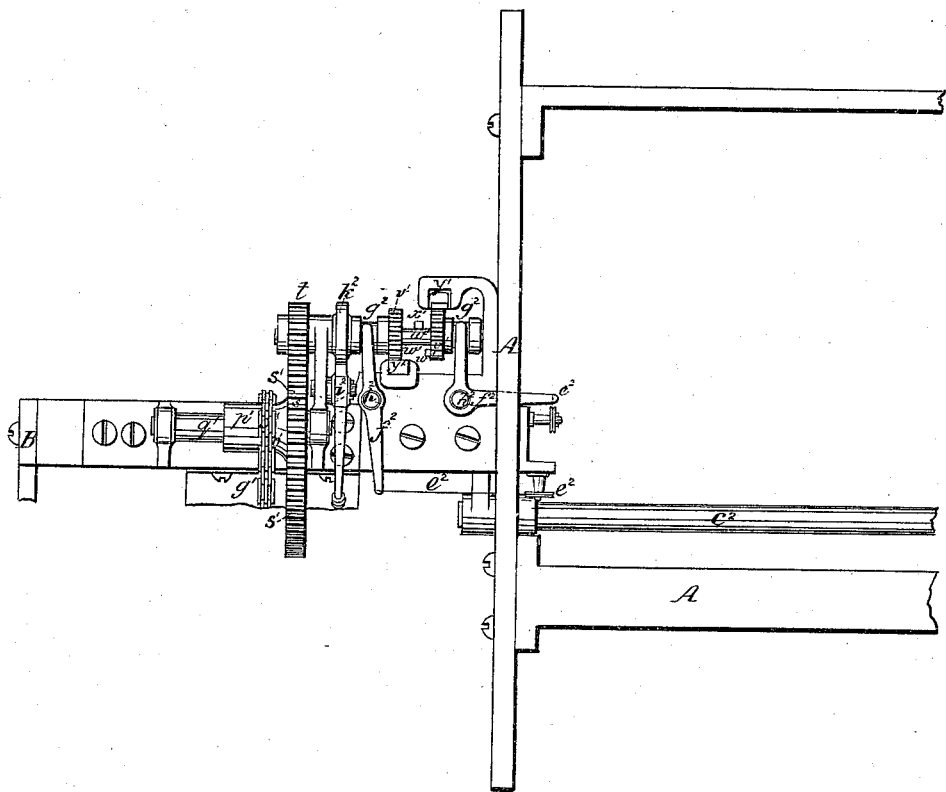

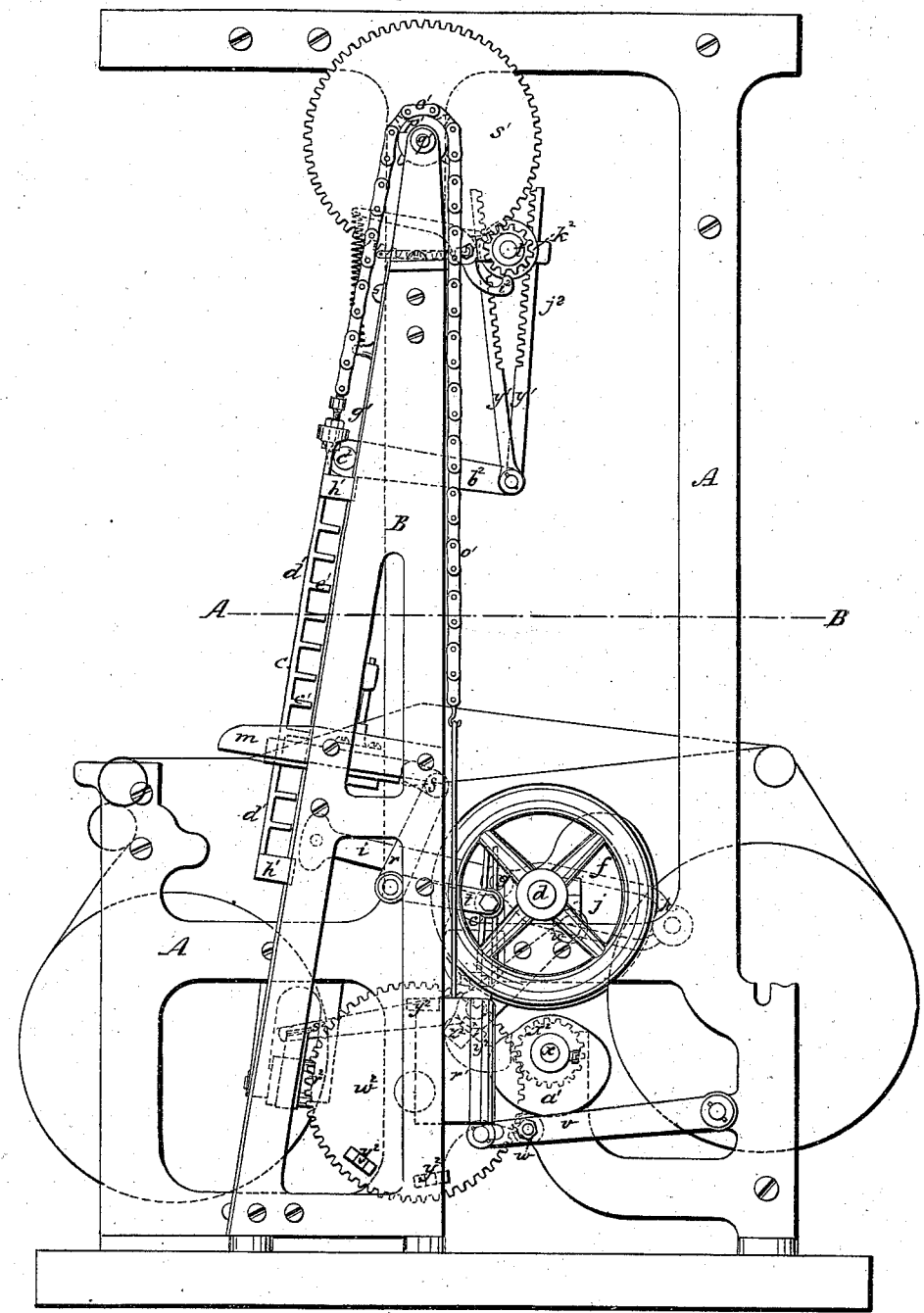

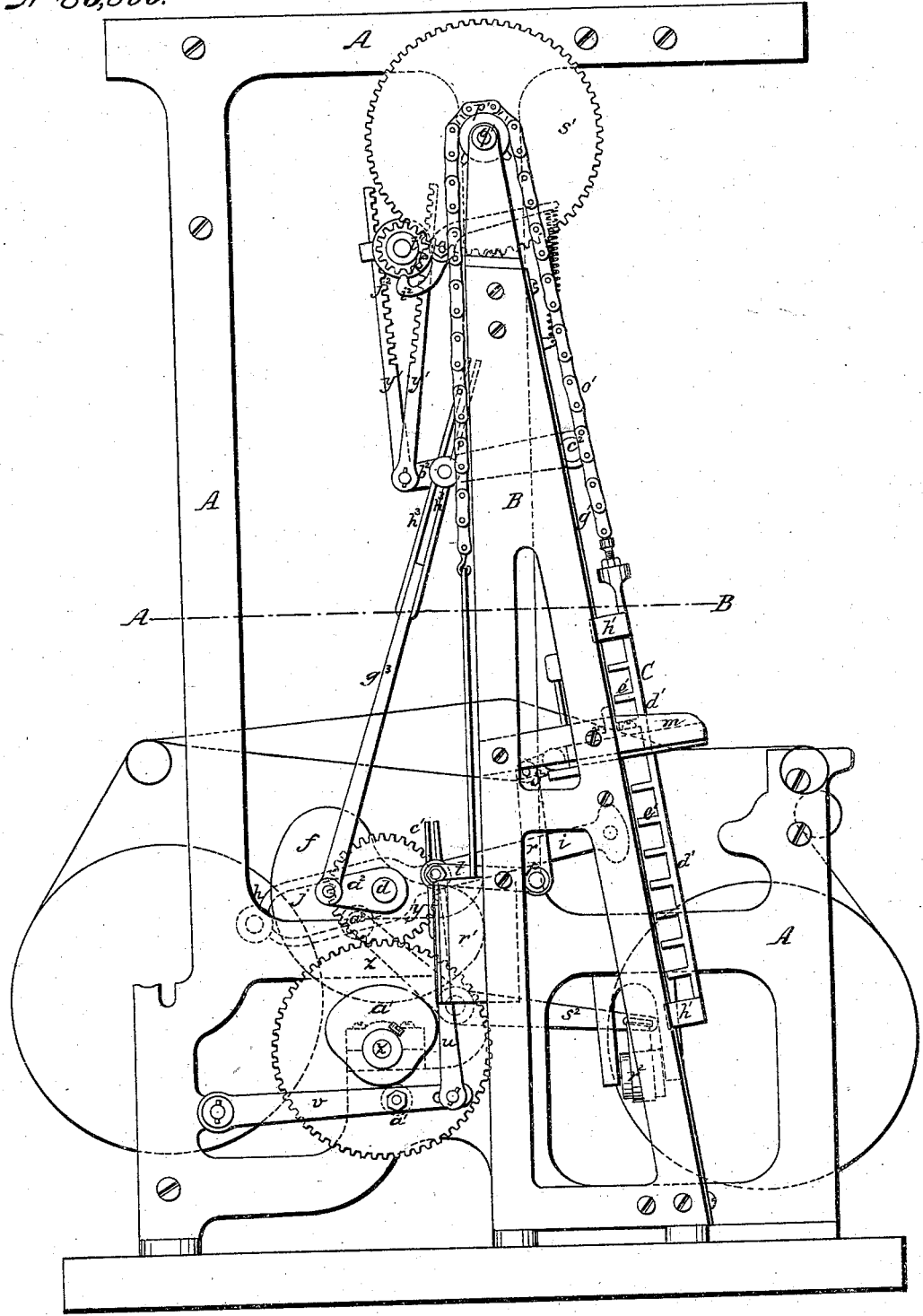

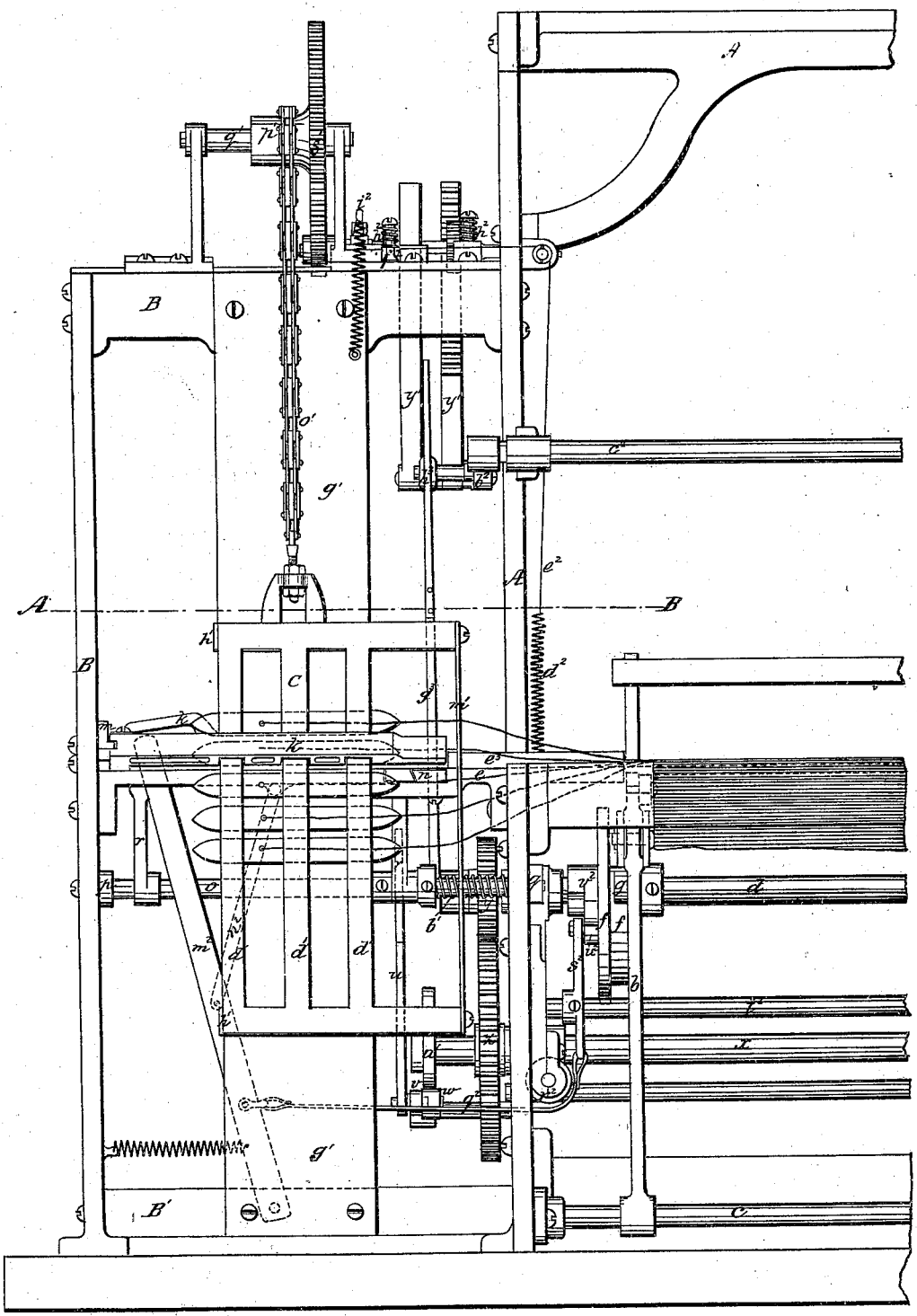

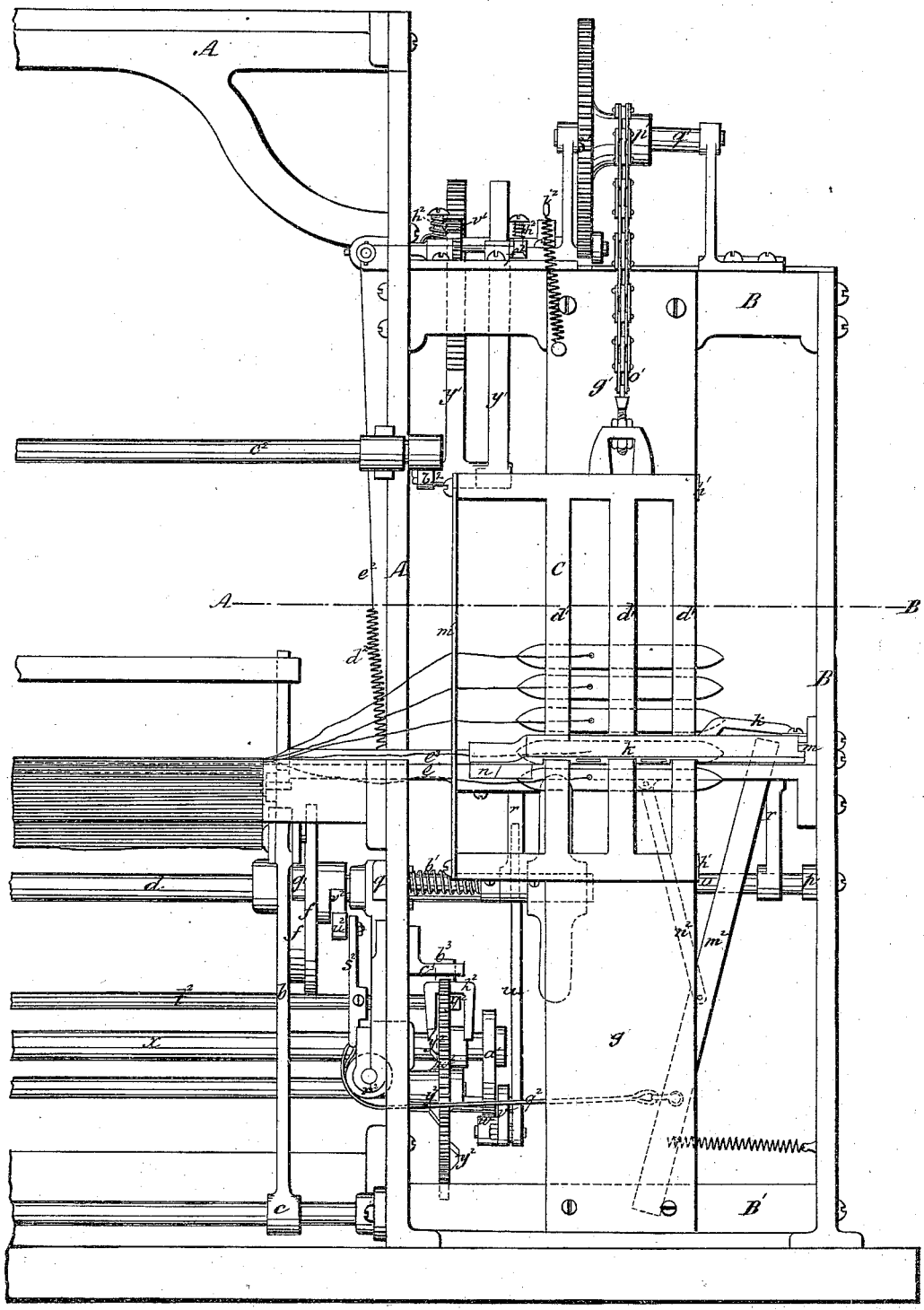

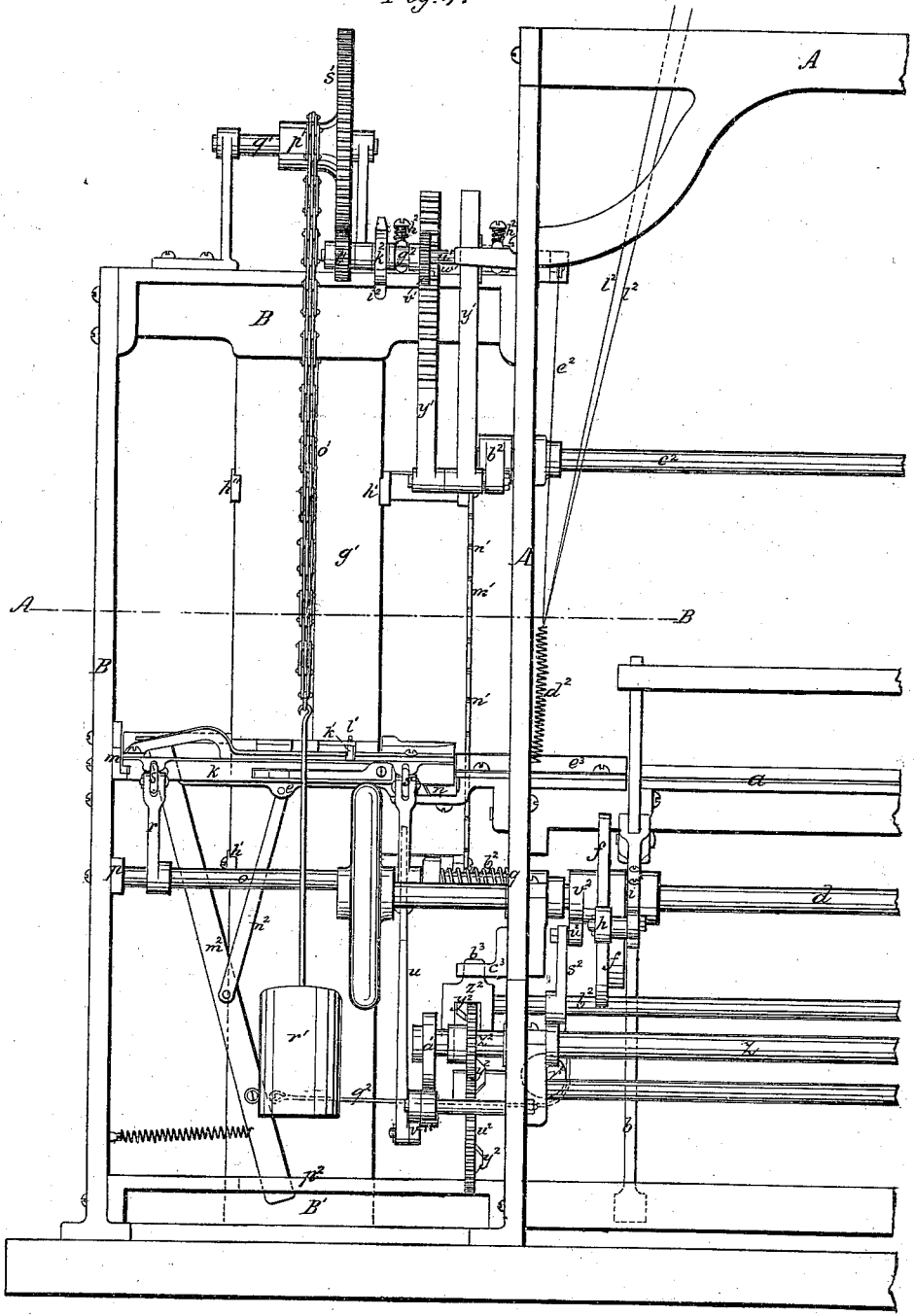

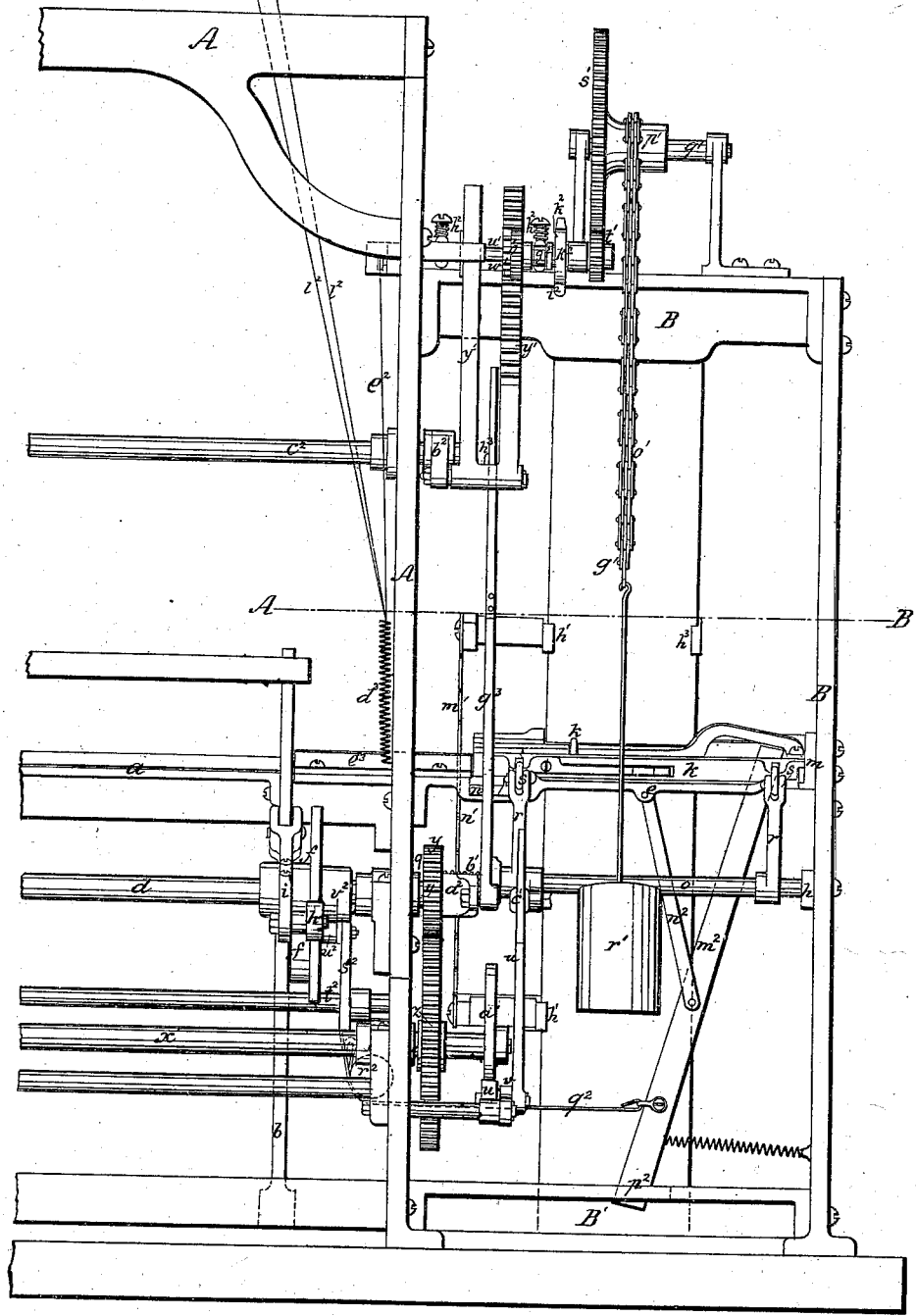

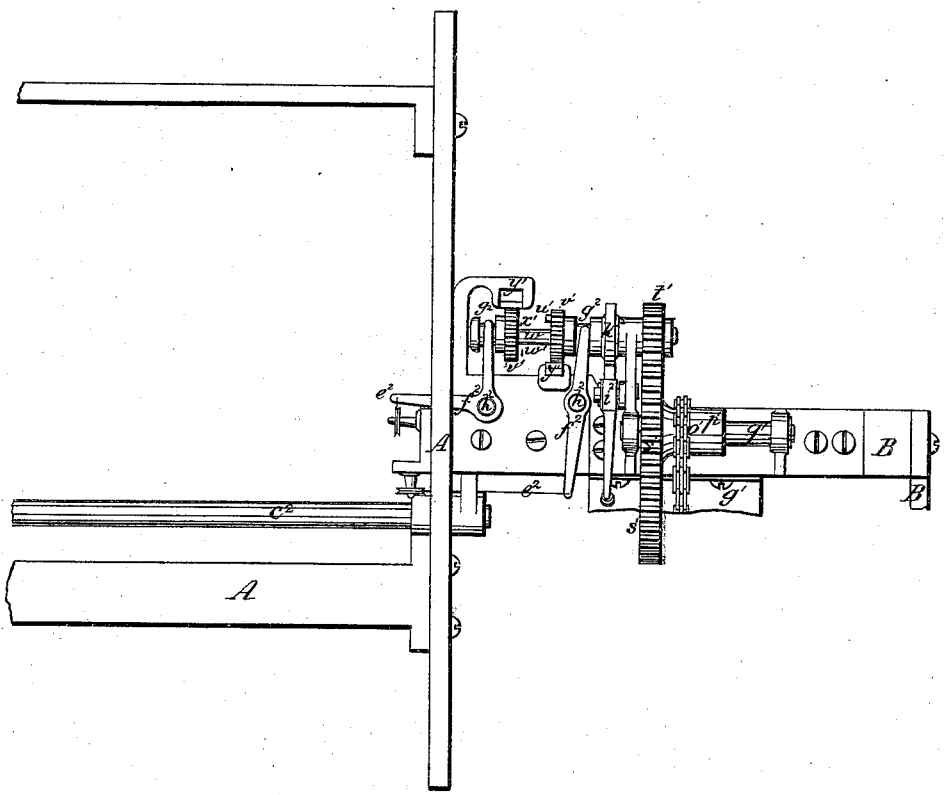

E. B. Bigelow.
Loom.
N°. 86,806. Patented Feb. 9, 1869.
Fig. 6.a
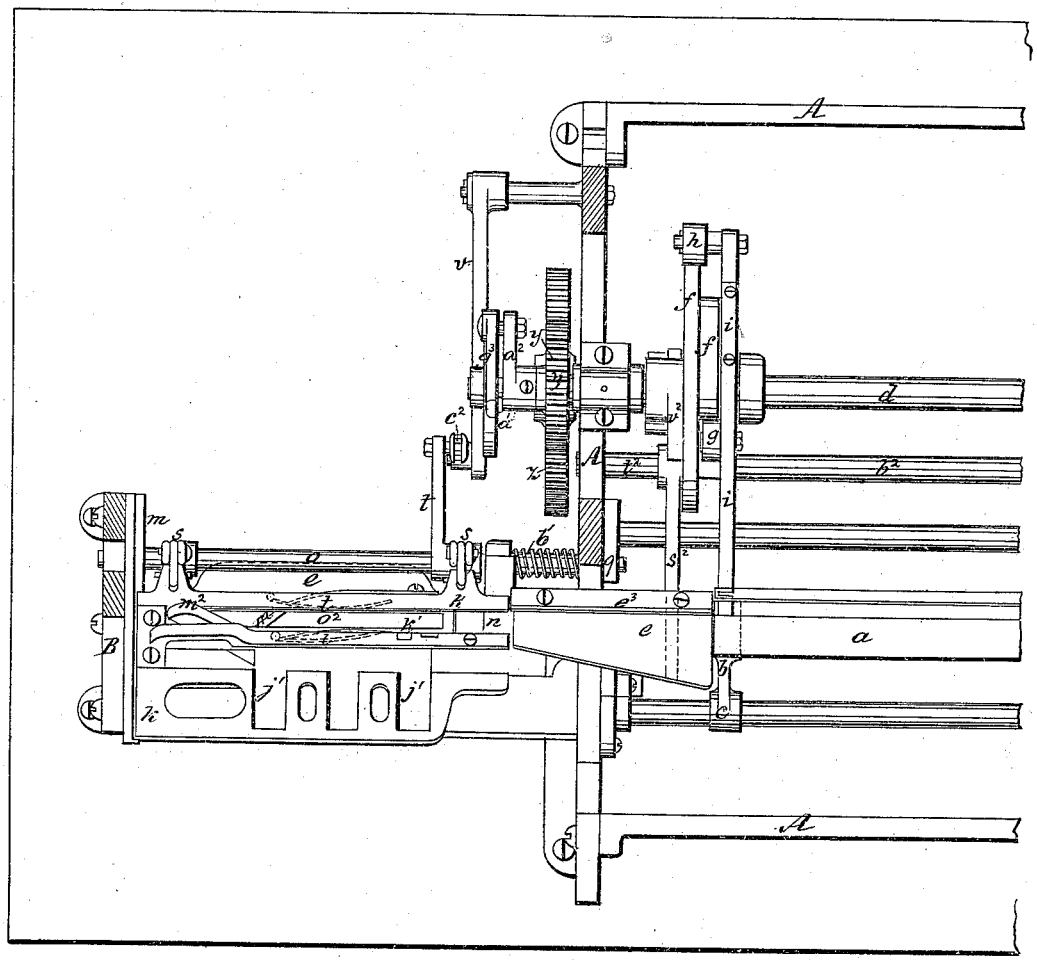
Witnesses
H. Austin Parks.
John H. Taylor.
Inventor
E. B. Bigelow.

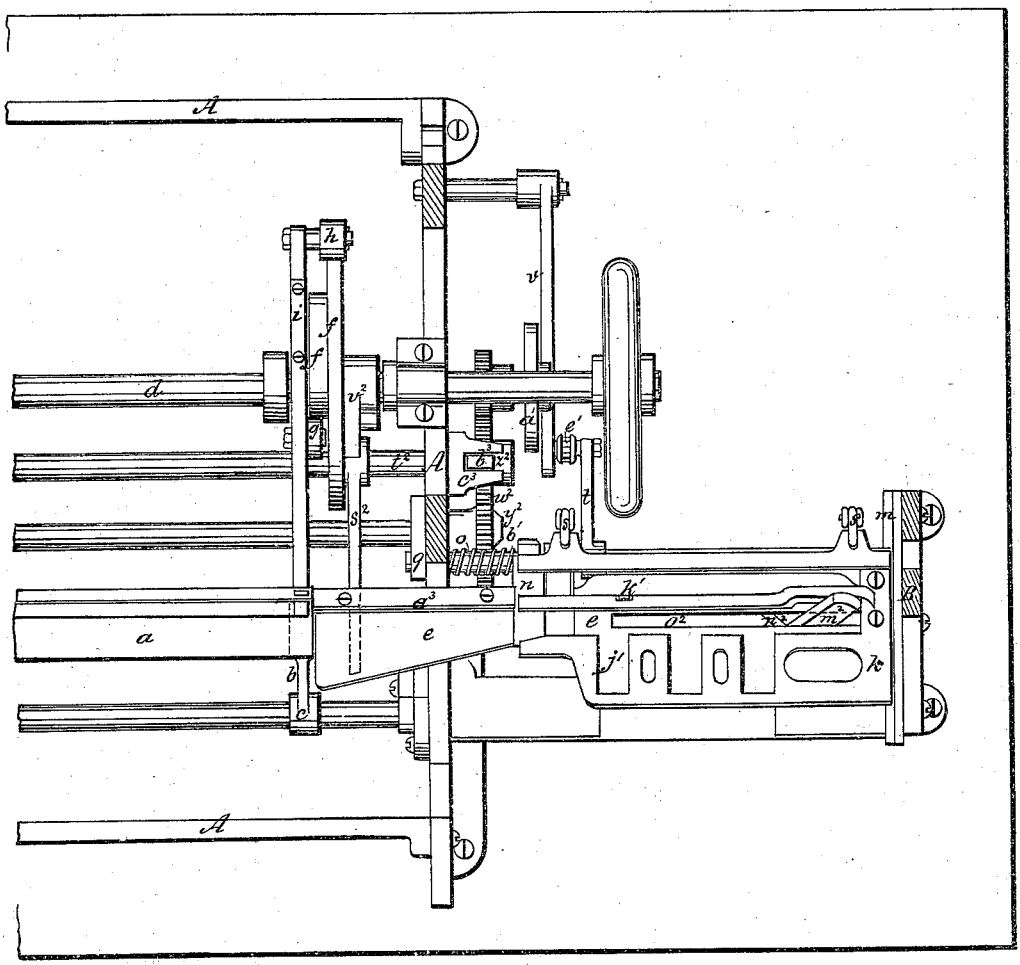

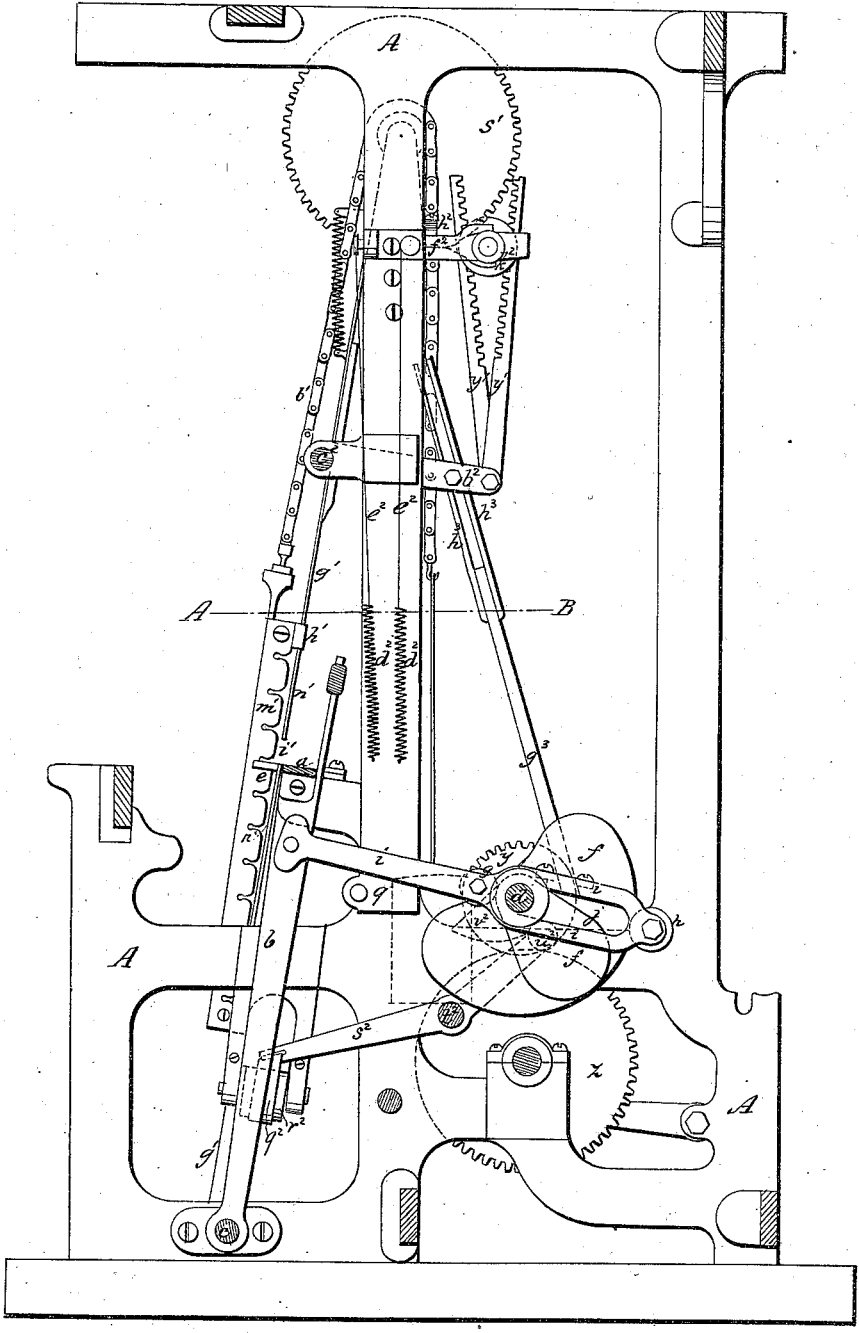

E. B. Bigelow. Sheet 12-12 Sheets.
Loom.
N°. 86,806. Patented Feb. 9, 1869.
Fig. 8.
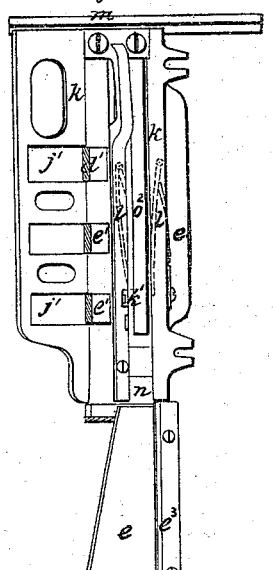
Fig. 9.
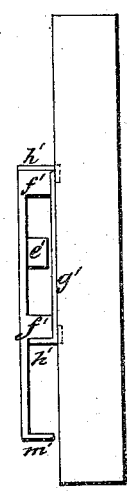
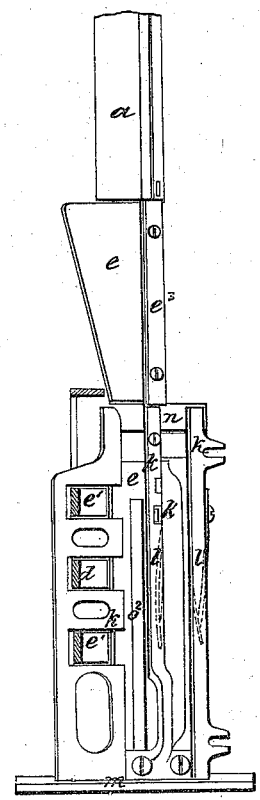
Witnesses
N. Austin Parke.
John H. Taylor.
Inventor:
E. B. Bigelow.

UNITED STATES PATENT OFFICE.

ERASTUS B. BIGELOW, OF BOSTON, MASSACHUSETTS.

IMPROVEMENT IN LOOMS FOR WEAVING INGRAIN CARPETS.

Specification forming part of Letters Patent No. 86,806, dated February 9, 1869.

*To all whom it may concern:*

Be it known that I, ERASTUS B. BIGELOW, of Boston, in the county of Suffolk and State of Massachusetts, have invented certain new and useful Improvements in Ingrain-Carpet Looms; and I do hereby declare that the following is a full and exact description thereof, reference being had to the accompanying drawings, and to the letters of reference marked thereon.

These improvements are particularly applicable to looms in which the shuttle-boxes are detached from the lay and supported by framework at the side of the loom, though some of them may be applied, and I intend to apply them, to looms in which the shuttle-boxes are carried by the lay. They relate to a mode of operating the lay of the loom whereby it receives its vibratory motion for beating up the cloth during only a part of a revolution of the lay-shaft, and remains at rest, or in such position as may be desired, for the throwing of the shuttles during the other part, the reed and race-bearer being held in an even plane with the acting shuttle-boxes while the shuttles are thrown; also, to a mode of constructing, arranging, and operating the shuttle-boxes; also, to a mode of shifting the shuttle boxes or holders, whereby the shuttles carrying the various colors of weft are brought into action, in accordance with the pattern of the cloth to be woven; also, to a mode of varying the order in which the picker-staves act to throw the shuttles as required to form the pattern or texture of the cloth.

The drawings clearly represent my improvements and such parts of an ingrain-carpet loom as are necessary to illustrate them.

Figure 1 is a right-hand end elevation; Fig. 2, a left-hand end elevation; Fig. 3, a front elevation; Fig. 4, a rear elevation; Fig. 5, a plan, showing the top parts of the loom down to the section-line A B; Fig. 6, a plan showing the parts below the section-line A B; Fig. 7, a transverse section, looking toward the left-hand end of the loom; and Fig. 8, a plan of horizontal shuttle-boxes with the reserve shuttle-holders in section.

The main frame-work of the loom is marked A, and the frame-work which supports the shuttle-boxes at the sides of the loom is marked B. The red lines indicate the position of the warps and the woven cloth; but the "let-off motion" and "take-up motion," which may be of the usual construction, are not represented; nor have I deemed it necessary to represent the Jacquard machine, nor the apparatus for driving and stopping the loom, as these parts of a carpet-loom are also well known.

My improved mode of operating the lay of the loom may be understood as follows: The lay is formed of a race-bearer, $a$, and two swords, $b\ b$, and oscillates on the axis $c$ in the usual manner. The lay-shaft is marked $d$, and has affixed to it two double-faced cams, $f f$, which work between rollers $g$ and $h$, carried by connecting-bars $i\ i$, the double-faced cams $f f$ being so formed that one set of their faces, at each revolution of the lay-shaft $d$, acts against the rollers $g$, to move the lay forward to beat up the cloth, and the other set against the rollers $h$, to draw the lay backward and hold it in position in an even plane with the acting shuttle-boxes while the shuttles are thrown. The connecting-bars $i\ i$, which transmit the cam-movement to the lay, are jointed at their forward ends to the swords $b\ b$, while their rear ends are supported by the lay-shaft $d$, which plays in slots $j\ j$, suitably formed in the connecting-bars $i\ i$ to receive it. This arrangement is clearly represented in Fig. 7. It gives great facilities for retaining the lay in a stationary position while the shuttles are thrown from shuttle-boxes which are detached from the lay, and also for adapting the movement of the lay to the throwing of the shuttles in wide looms, in which the shuttle-boxes swing with the lay.

I will now describe my improved mode of constructing, arranging, and operating the shuttle-boxes; and in order that it may be more readily understood, I would remark that two-ply carpeting is composed of two plies of cloth, one of which is called the "ground-ply" and the other the "figure-ply," the two plies, which are of different colors, being ingrained or interchanged to form the figure.

In the process of weaving, the filling-threads of the two plies are introduced in alternate succession—that is, a ground-ply thread is thrown in, then a figure-ply thread, then a ground-ply thread, and so on.

In weaving a pattern in which the ground-ply is wholly of one color and the figure-ply of another color, two shuttle-boxes on each side of the loom only are required; but the patterns most in use have either the figure-ply, or both the ground-ply and figure-ply, of various colors, and as each color of filling requires its particular shuttle, it is essential to a complete carpet-loom that it be capable of operating a series of shuttles for each ply of the cloth, and that the shuttle-boxes be so organized as to throw a ground-shuttle and a figure-shuttle in alternate succession, and also to shift each of the series of shuttle-boxes, to introduce the various colors of filling in each ply of the cloth, in accordance with the pattern being wrought.

According to my original mode of effecting these objects, described in a patent for improvements in carpet-looms granted to me the 18th day of February, 1846, the shuttle-boxes are supported by pendulous frames, which are hung at each side of the loom, and swung backward or forward at each beat of the lay to bring the ground and figure shuttles into alternate action, while the series of boxes or holders which carry the reserve shuttles are moved upward and downward to change the colors.

In a patent granted to William Markland the 5th day of February, 1861, another mode of changing the shuttles is described, a characteristic feature of which is, that the ground and figure ply shuttles are brought into alternate action without moving those that are held in reserve, the cylindrical series of shuttle boxes or holders which carry the reserve shuttles remaining stationary, except when turned at varying intervals to effect a change of color.

By my improved mode of constructing, arranging, and operating the shuttle-boxes I combine in a measure the advantages of both the previous modes just alluded to.

I apply on each side of the loom two horizontal shuttle-boxes, which are moved forward or backward at each beat of the lay to bring the ground and figure fly shuttles into alternate action, these shuttle-boxes being all that are required to weave a carpet composed wholly of two colors of filling.

To supply the variously-colored filling for the more elaborate styles of carpeting, I employ, on each side of the loom, a numerous series of shuttle boxes or holders, supported, by stationary frame-work, in a vertical, or nearly vertical, position in front of the shuttle-race, on each side of the loom, the series on one side carrying the reserve shuttles for the ground-ply, and the series on the other side the reserved shuttles for the figure-ply, each of the series being moved upward or downward, as may be required, to changed the colors of their respective plies of cloth.

The horizontal boxes are made to co-operate with the vertical series in such manner that the ground and figure ply shuttles may be changed in alternate succession without moving the reserve shuttles, which remain at rest, except when they are raised or lowered to bring into use a new color.

The shuttle-boxes and the parts with which they are connected are clearly represented in Figs. 1, 2, 3, 4, and 6.

To assist in supporting the shuttle-boxes, and to support the shuttles as they pass from the shuttle-boxes to the race-bearer of the lay, a table-formed plate, $e$, is placed at each side of the loom and affixed to the frame-work A and B. The upper surfaces of these table-formed plates are suitably finished, the parts over which the shuttles pass being formed in the same plane as the shuttle-race of the lay, and they carry guide-plates $e^3$, which guide the shuttles as they pass from the shuttle-boxes to the race-beam of the lay.

The horizontal shuttle-boxes are marked $k$, and are clearly represented in the drawings.

The shuttle-binders are marked $l$, and operate on the shuttles in the usual way. They may be connected with the shipper to stop the loom when a shuttle fails to enter its box, in the manner described in my patent of the 18th of February, 1846, before alluded to. These shuttle-boxes have no bottoms affixed to them, the shuttles being supported by the table-formed plates $e$ and the vertical shuttle-holders presently to be described. They are supported and guided in their vibratory movement by stands $m$, affixed to the framing B, and stands $n$, affixed to the table-formed plates $e$, projections on these stands being fitted to corresponding grooves in the shuttle-boxes, so as to hold them in position.

The front sides of the front shuttle-boxes are bent and shaped as represented in Figs. 6 and 8, whereby they are caused to present to the sides of the shuttles a sufficient extent of surface to guide and support them, and are made capable of being moved forward and backward to bring the ground and figure ply shuttles into action alternately without contact with the bars or frame of the vertical shuttle-holders, as will be more fully explained.

$o\ o$ are rock-shafts, the outer ends of which are supported by stands $p$ and their inner ends by stands $q$. These rock-shafts carry upright levers $r$, the upper ends of which are pin-jointed at $s$ to the rear sides of the horizontal shuttle-boxes and horizontal levers $t$, which are connected by rods $u$ to the levers $v$, the rods $u$ being attached to the levers $t$ by the spring-clip $c^1$, which yields when the movement of the shuttle-boxes is impeded, and thus prevents breaking the machinery.

The cam-shaft $x$ receives its motion from the lay-shaft $d$ by the action of the gears $y$ and $z$, and carries the cams $a^1$, one at either end thereof, which act on rollers $w$, and, through the parts just mentioned, move the shuttle-boxes.

Springs $b^1$ on the rock-shafts $o$, for which a weight may be substituted, draw the boxes forward, and the cams $a^1$, overcoming the springs $b^1$, draw them backward, the cams $a^1$ being so shaped as to change the boxes while the lay vibrates, and to hold them in a stationary position with the backs of the acting boxes in a line with the reed while the lay is at rest and the shuttles are thrown.

The vertical series of shuttle boxes or holders, which carry the reserved shuttles, are marked C. They are slightly inclined backward to conform them to the plane of the reed when the shuttle is thrown, and consist of frames formed of vertical ribs $d^1$ and shelves or ledges $e^1$, on which the shuttles rest.

At each of the four corners of the frames is a projecting foot, $f^1$, which is slightly longer than the width of the shelves, and is on the same side of the frame as the shelves, which feet rest against the plate $g^1$, and are held down by lugs $h^1$, which lugs pass around behind the plate $g^1$, and thus form guides for guiding the shuttle-holders in their up-and-down movement.

The relation of the parts just described is shown in Fig. 9, which is a plan of the same.

The plates $g^1$ are made in two parts on each side of the loom, and have a space between them at $i^1$, as shown in Fig. 7, just above the table-formed plate $e$, to allow the shuttles in the shuttle-holders to be pushed from the shelves $e^1$ onto the table-formed plates $e$, and vice versa, the upper parts being affixed to the girth B and the lower parts to the girth $B^1$, the upper end of the lower parts being also affixed to the table-formed plates $e$.

The plates $g^1$, in addition to guiding and supporting the vertical shuttle-holders, serve as guards to keep the shuttles on the shelves.

The vertical ribs $d^1$ of the frames of the vertical shuttle-holders pass up and down freely through the recesses $j^1$ of the front sides of the front horizontal shuttle-boxes, as represented in Figs. 6 and 8.

The horizontal shuttle-boxes, from which the shuttles are thrown, work in co-operation with the vertical shuttle-holders, as follows: When the horizontal shuttle-boxes are moved forward so as to bring the shuttles in the rear box into action, the front box is in the same vertical plane as the shuttles in the vertical series of holders, so that the vertical series, with its shuttles, may be moved up and down through said front box freely; and it is when the horizontal boxes are in this position that the reserve shuttles are changed. Then, when the horizontal boxes are moved backward to bring a shuttle from the series into action, the front side of the front horizontal box passes between the shelves of the vertical holders, and slides the shuttle off of its shelf through the opening $i^1$ onto the table-formed plate $e$, from which it is thrown across the loom, and when the shuttle has been thrown back again the horizontal boxes, by their forward movement, return the shuttle to its former position in the holder. By thus moving the horizontal shuttle-boxes forward or backward at each beat of the lay, the ground and figure ply shuttles are brought into action alternately, while the shuttles of either ply are changed, when required, without interfering with such movement; and, in order that the series of shuttles on one side of the loom may be received into the rear horizontal box on the other side, and thus employ the ground and figure shuttles for their respective plies of cloth, the cams $a^1$ are so adjusted with respect to each other as to move the horizontal boxes in alternate directions—that is, move those on one side of the loom forward, while those on the other side are moved backward, and vice versa.

When the shuttle-boxes are moved forward, a projection, $k^1$, on the inner end of the shuttle-binders $l$ of the front boxes strikes against studs $l^1$, affixed to the plates $g^1$, which pushes the shuttle-binders back, so as to free the shuttle and prevent it from obstructing the movement of the vertical series of holders.

Each of the vertical series of holders carries a filling-guide plate, $m^1$, for keeping the threads of filling separated from each other, so that the horizontal boxes may pass between the shelves of the vertical holders without conflicting with them, which guide-plate also serves to prevent the shuttles from being drawn out of the shuttle-holders by the filling when the shuttles are carried above or below the plane of the cloth. Recesses $n^1$, as shown in Fig. 7, are formed in these guide-plates, there being one such recess for each shelf, into which recesses the threads of filling are led as the shuttles in either of the front boxes are carried by the box onto their shelves in the shuttle-holder, and are withdrawn again when the shuttles are thrown.

The mouth of the recesses $n^1$ should be so formed as to readily receive the filling; and in place of the filling-guide plates $m^1$, (represented in the drawings,) the shelves $e^1$ of the shuttle-holders may be prolonged so as to guide and support the filling, and a smooth plate be put in the place of the filling-guide plate $m^1$, to prevent the shuttles from being drawn out of the holders by the filling.

The mode of shifting the vertical shuttle boxes or holders to change the colors of weft is as follows: The arrangement of mechanism for this purpose is clearly shown in the drawings, in Figs. 1, 2, 3, 4, and 5, and is the same on both sides of the loom. $o^1$ are chains by which the vertical shuttle-boxes are suspended. They pass over chain-wheels $p^1$ on the axis $q^1$, and carry the weights $r^1$, which counterbalance the weight of the shuttle-holders. On each of the axes $q^1$ a toothed wheel, $s^1$, is fixed, into which gears a pinion, $t^1$, on an axis, $u^1$. On each axis $u^1$ are two pinions, $v^1$, either of which can be allowed to turn freely upon it, or be made fast therewith, by being slid endwise on the shaft, so as either to cause a projection, $w^1$, on the side of the pinion to engage with a clutch-pin, $x^1$, on the shaft, or to disengage this projection from the clutch-pin. With the two pinions $v^1$ gear two upright toothed racks, $y^1$, which gear with opposite sides of the pinions, so that when the racks are simultaneously moved endwise one pinion will be caused to turn in one direction and the other in the opposite direction. The racks have an upward and downward movement given to them at each revolution of the lay-shaft $d$ by means of the crank $a^2$ upon it in the following manner: The toothed racks at each end of the loom are carried by lever-arms $b^2$ on the axis $c^2$, which passes across the loom. One of these arms, by a connecting-rod, $g^3$, is connected with the crank $a^2$, the connecting-rod being formed at its upper end with a spring-clip, $h^3$, which clips a pin on the side of the lower arm, so that if either of the racks is unable to rise or fall the clip will give way and the loom will not be injured.

When it is not desired to raise or lower the shuttle boxes or holders, both pinions are held back, so as to be out of gear with the clutch-pin $x^1$, by spiral springs $d^2$, (for which weights may be substituted,) acting on the cords $e^2$, attached to one end of the levers $f^2$, the opposite end of which is received in a groove, $g^2$, in the bosses of the pinions; but when one or other pinion is to be put in gear the spring or weighted cords $e^2$, which before drew back its lever, are raised, and a coiled spring, $h^2$, around the axis of the lever, then turns the lever in the opposite direction to that in which it was before drawn by its spring or weighted cord, and, by so doing, slides the pinion into gear with the clutch-pin $x^1$, so that when the rack gearing with the pinion moves downward, the axis $u^1$ will be turned, and the shuttle-holders will be either raised or lowered a distance equal to the distance between their shelves, according to which pinion it is that is thrown into gear.

When the shuttle-holders have thus been moved the distance of one shelf, either up or down, they are accurately brought to and maintained in their proper position by a spring-clutch lever, $i^2$, entering a notch, $j^2$, in the disk $k^2$, fast on the axis $u^1$. This spring-clutch will, however, yield to allow the shuttle-holders to rise or fall, if one of the before-mentioned pinions be fast with its axis, while the racks are descending. While the racks are ascending, neither of the pinions can be made fast with its axis, as the projections $w^1$ upon it, and the clutch-pin $x^1$, are made with beveled edges, so as not to engage with one another when the pinions are turned in the direction given to them by the racks in rising; but when the racks descend, either one or other of the pinions can be put in gear, as above explained, and the axis $u^1$ thus caused to turn in one or the other direction.

The spring or weighted cords $e^2$, acting on the levers $f^2$, may be raised at the times required for putting the pinions with which they work into gear by means of other cords, (marked $b^2$,) leading to and acted on by the Jacquard machine. When either of the pinions is required to be thrown into gear with its axis, it is put into gear during the time the racks are being moved upward, in order to be at once ready to act when the racks commence to descend.

The mode of varying the order in which the picker-staves act to throw the shuttles will now be described.

The picker-staves are marked $m^2$, and are suspended by bars $n^2$, the upper ends of which are pin-jointed to the table-formed plates $e$, before described, and their lower ends to the picker-staves $m^2$, the relation of the parts being such as to cause the upper ends of the picker-staves to move parallel with the shuttle-boxes, or nearly so, when they throw the shuttles. The lower ends of the picker-staves ply in slots $p^2$ in the girth $B^1$, and their upper ends in slots $o^2$ in the table-formed plates $e$.

The picker-staves are connected by straps $q^2$, passing around guide-pulleys $r^2$ to the forward ends of the levers $s^2$. These levers are capable of rocking upon the shaft $t^2$, and carry at their rear ends friction-rollers $u^2$, which are acted upon by the cams $v^2$ on the lay-shaft $d$, and these cams are so formed as to give a sudden forward movement to the picker-staves at the times required.

The levers $s^2$ are capable of turning freely upon the shaft $t^2$, but not of moving longitudinally thereon. The shaft $t^2$ itself, however, receives an endwise movement, to bring one or other of the friction-rollers $u^2$ opposite its cam $v^2$, according as the shuttle is to be thrown from one or other end of the loom.

The required vibratory motion is given to the shaft $t^2$ by means of a pattern-gear wheel, $w^2$, which is driven by the pinion $x^2$ on the cam-shaft $x$.

The pattern-gear wheel $w^2$ has cam-surfaces $y^2$ placed upon it, which are made movable, and may be arranged in any order of succession which may be required.

The shaft $t^2$ carries a fork, $z^2$, which embraces the pattern-gear-wheel $w^2$, and is moved to and fro by the cam-surfaces $y^2$ in the order in which they are placed on the pattern-gear wheel, the levers $s^2$ being placed in such relation to each other and to the cams $v^2$ that only one of them can be acted upon at the same time, for when the friction-roller of one of the levers is in a position to be acted upon by its cam, the friction-roller of the other lever will clear the other cam, and vice versa.

The shaft $t^2$ is prevented from rotating by means of an arm, $b^3$, at its end, which is retained in position by playing in a slot in the stand $c^3$, affixed to the loom-frame.

By placing the picker-staves $m^2$, which throw the shuttles, below the horizontal shuttle-boxes $k$, and causing their upper ends to ply in the slots $o^2$ in the table-formed plates $e$, I am enabled to dispense with picker-rods, and throw both the ground and figure ply shuttles by one picker-staff.

It will be obvious to those acquainted with carpet-looms that the form and arrangement of the parts by which my improvements are exemplified in the foregoing specification may undergo many modifications without departing from the principle of my invention—as, for instance, in arranging a loom for weaving carpets known as "shaded shot and shot" two-plies, three horizontal shuttle-boxes will be required, instead of two, as above described, for the ordinary two-ply carpets. So, also, will three or four horizontal shuttle-boxes be required for weaving three-ply carpets.

Having described my invention, what I claim therein is—

1. The combination of the series of shuttle-boxes, constructed substantially as described, and reciprocating in the plane of the race of the lay when thrown back, with the series of shelves carrying reserve shuttles, and sliding at right angles thereto, the two series operating together as and for the purpose set forth.

2. The mechanism, substantially as herein described, for changing the position of the series of reserve-shuttle shelves, consisting of a rotary shaft, two sliding-clutch pinions, having reciprocating rotary motions in opposite directions, sliding racks or equivalents, and mechanism for changing the position of the pinions.

3. The mechanism hereinbefore described for throwing the shuttles, consisting of two picker-staves, placed below the reciprocating shuttle-boxes, and with their upper ends playing in slots in table-formed plates, two levers, carried by one shaft, and a pattern-wheel, having movable cam-surfaces, for sliding said shaft, all constructed and arranged together as specified.

4. In combination with a series of shuttle-boxes detached from the lay, and a vibrating lay, the double-faced cams, as herein described, when one of their faces moves the lay forward to beat up the cloth, and the other moves it backward, and holds it in an even plane with the acting shuttle-boxes while the shuttle is thrown, substantially as specified.

E. B. BIGELOW.

Witnesses:
H. AUSTIN PARKS,
JOHN H. TAYLOR.